United States Patent
Hehls, III (10) Patent No.: US 6,542,809 B2
(45) Date of Patent: Apr. 1, 2003

(54) METHOD AND SYSTEM FOR DISPLAYING TARGET VEHICLE POSITION INFORMATION

(75) Inventor: E. Christian Hehls, III, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 70 days.

(21) Appl. No.: 09/793,006

(22) Filed: Feb. 26, 2001

(65) Prior Publication Data

US 2002/0120391 A1 Aug. 29, 2002

(51) Int. Cl.$^7$ .............................................. G06F 19/00
(52) U.S. Cl. .................. 701/120; 701/117; 701/17; 342/36; 342/37
(58) Field of Search ........................ 701/120, 17, 117, 701/200; 342/36, 37, 32, 46, 63

(56) References Cited

U.S. PATENT DOCUMENTS

| | | | |
|---|---|---|---|
| 5,519,618 A | * 5/1996 | Kastner et al. | 701/120 |
| 5,557,278 A |   9/1996 | Piccirillo | |
| 5,670,961 A | * 9/1997 | Tomita et al. | 342/36 |
| 6,047,233 A | * 4/2000 | Salvatore et al. | 701/120 |
| 6,208,284 B1 | * 3/2001 | Woodell et al. | 340/961 |
| 6,222,480 B1 | * 4/2001 | Kuntman et al. | 342/30 |
| 6,246,320 B1 | * 6/2001 | Monroe | 340/506 |

FOREIGN PATENT DOCUMENTS

WO        WO 9935630 A        7/1999

OTHER PUBLICATIONS

Pawlowski, Angela M., "Simulator, Workstation, and Data Fusion Components for Onboard/Offboard Multi–Target Multi–Sensor Fusion," Digital Avionics System Conference, 1998 Proceedings, 17th DASC. The AIAA/IEEE/SAE Bellevue, WA, USA Oct. 31 –Nov. 7, 1998, New York, NY, USA, Oct. 31, 1998, pp. C31–1 to C31–8, p. C31–7, left hand column, p. C31–7; figure 12.

Capezzuto, Vincent, "Runway Incursion Reduction Program (RIRP) Surveillance System, NASA/FAA Atlanta Demonstration," Digital Avionics System Conference, 1998 Proceedings, 17th DASC. The AIAA/IEEE/SAE Bellevue, WA, USA Oct. 31 –Nov. 7, 1998, New York, NY, USA, Oct. 31, 1998, pp. F31–1 to F31–8., pp. F31–2 –F31–3; figure 2.

* cited by examiner

Primary Examiner—William A. Cuchlinski, Jr.
Assistant Examiner—Marthe Marc-Coleman (57) ABSTRACT

A system and method for displaying target vehicle position that combines the data available from a plurality of surveillance sensors. Data from the plurality of sensors is fused to calculate a composite target position and a projected track for each vehicle within the range of the sensors. The composite data is also used to calculate a boundary of certainty for both the position and the projected track. The position, projected track and the boundaries of certainty for each target vehicle can be displayed on a display screen.

15 Claims, 8 Drawing Sheets

METHOD AND SYSTEM FOR DISPLAYING TARGET VEHICLE POSITION INFORMATION

BACKGROUND OF THE INVENTION

This invention relates generally to a method and a system for displaying target vehicle position information, and more specifically to a method and a system for displaying vehicle position based on the fusion of data from a plurality of sensor sources.

Current air traffic display systems display position report and vehicle track information based on information from a single surveillance sensor. In present systems radar sensors are the primary and often the sole means of surveillance for air traffic managers. Other sensors play only a secondary role. Typically ground control radar is used by the air traffic manager to provide a two dimensional analog display on a screen. The location of an aircraft detected by the ground control radar is indicated by a dot on the screen and is tagged with data from secondary sources. The tag information is a textual display providing the air traffic manager with information such as target identification, last assigned altitude, current altitude trend, and the like. The secondary source providing such information can be, for example, a transponder on the target aircraft.

Although multiple surveillance sensors are available, current air traffic display systems do not make use of the information available from such sensors except to provide tag information. The primary source of information used by air traffic managers has been ground control radar. Like all surveillance sensors, the surveillance data provided by ground control radar has errors inherent in the data in both the range and azimuth of the detected target aircraft. These errors occur, at least in part, because of the scanning nature of the radar.

The job of the air traffic managers is to insure a safe margin of aircraft separation while controlling an orderly and efficient pattern of takeoffs and landings. The difficulty of this job is increased by the uncertainty in aircraft position data provided by the surveillance sensors and displayed on the screen. Additionally, primary reliance on a single source of position data subjects the air traffic control system to the danger of total interruption of service if the data stream from that single source is interrupted for any reason. A need therefore exists for an improved air traffic display system and for a method for displaying target vehicle position information that will have improved accuracy and that will provide redundancy in the event that information from the primary surveillance sensor is interrupted.

BRIEF SUMMARY OF THE INVENTION

In accordance with one embodiment of the invention, a method is provided for displaying target vehicle position information based on inputs from a plurality of sensors. Each of the sensors contributes traffic information data for each of the target vehicles within the range of the sensors. For each of the target vehicles, the traffic information from each of the plurality of sensors is fused to calculate a derived target position. It is this derived target position that is then displayed on the traffic display system screen. In accordance with a further embodiment of the invention, the fused data is further used to calculate a historical track of a target vehicle and a projected track for that vehicle. Preferably both the target position and the projected track are displayed with a boundary of certainty so that one using the displayed information will be aware of the uncertainty in the information.

BRIEF DESCRIPTION OF THE DRAWINGS

A more complete understanding of the present invention may be derived by referring to the following detailed description and claims when considered in connection with the following illustrative figures.

DETAILED DESCRIPTION OF PREFERRED EMBODIMENTS

Figure 1:
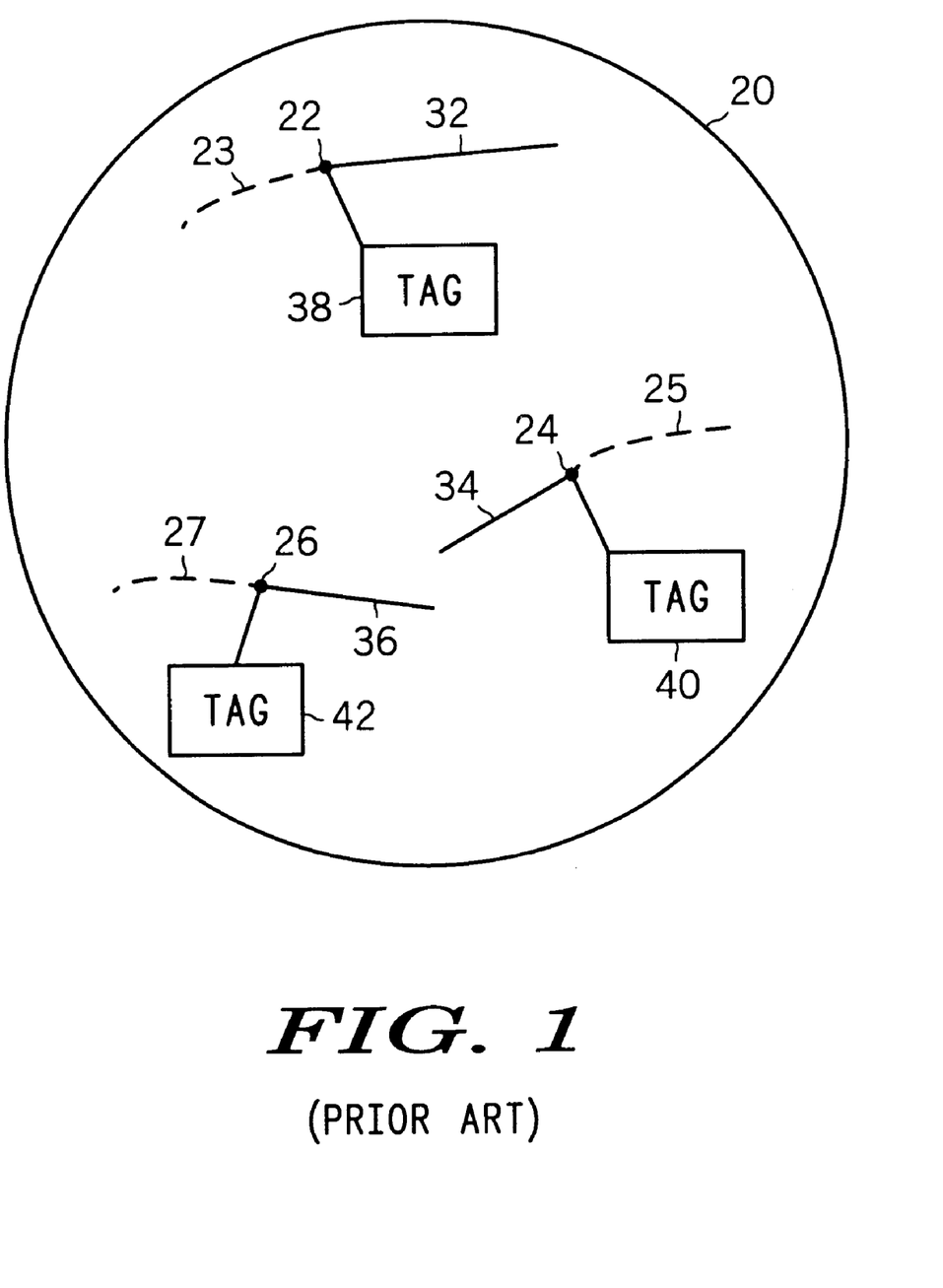
FIG. 1 illustrates a prior art air traffic control display screen.

FIG. 1 illustrates a display screen 20 such as those that are available, at the present time, to an air traffic controller or other air traffic management specialist to insure adequate separation between the aircraft under his control. Displayed on screen 20 are the positions of three target vehicles 22, 24, and 26. The dot on the screen for each of these vehicles indicates its relative position. In addition, screen 20 displays the historical track 23, 25, and 27, respectively, of the three target vehicles and also the projected track 32, 34, and 36, respectively for each of the target vehicles. Still further, the display screen indicates a "tag" or textual information display 38, 40, and 42, respectively, for each of the target vehicles. The tag can include, for example, such information as the target identification number, last assigned and current altitude, and the like. In prior art air traffic display systems, the information displayed on display screen 20 is derived from a single surveillance sensor, usually ground control radar, that provides the positioning information, plus an additional source of tag information, such as a transponder on each of the target vehicles. Although information has been available from other surveillance sensors such as approach radar, GPS units on the aircraft, and the like, data from such additional surveillance sensors has not been incorporated into the display.

Figure 2:
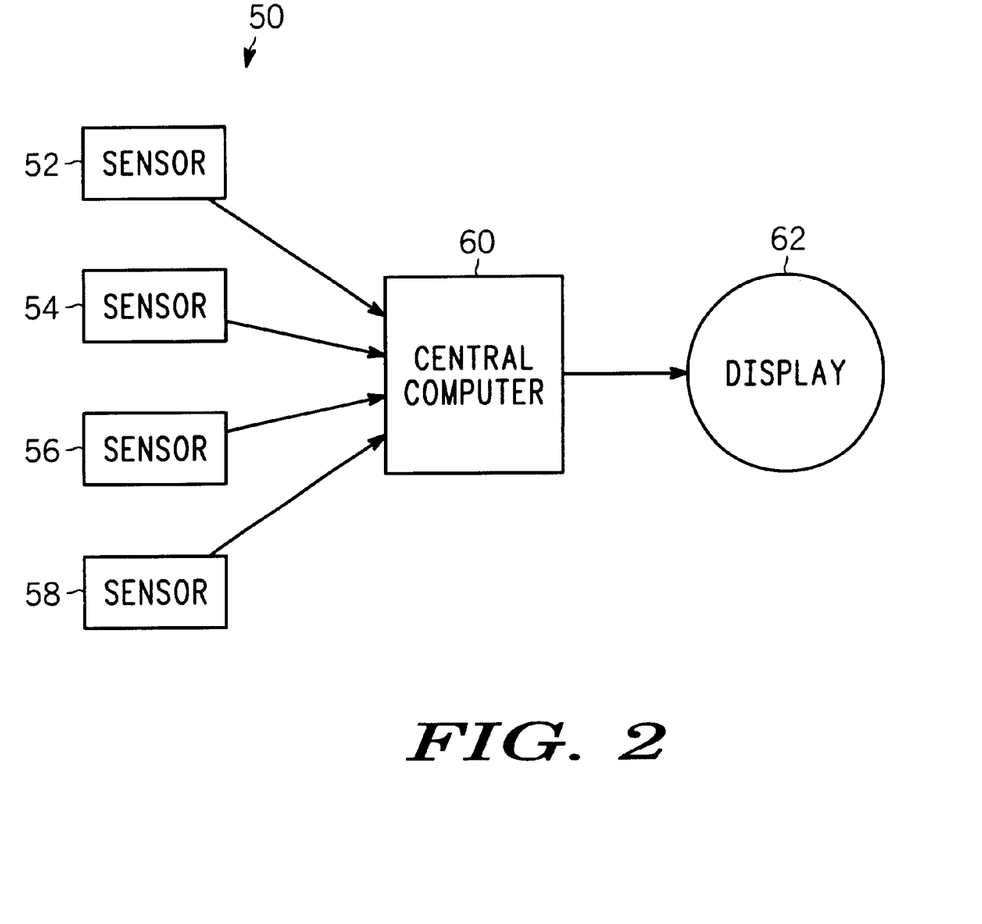
FIG. 2 illustrates schematically an air traffic display system in accordance with an embodiment of the invention.

FIG. 2 illustrates schematically an improved air traffic display system in accordance with an embodiment of the present invention. Air traffic display system 50 includes a plurality of surveillance sensors, 52, 54, 56, and 58. The sensors can include, for example, ground radar, arrival radar, GPS units, airborne radar, and the like. The outputs of each of the sensors represent surveillance data on each target vehicle within the range of that sensor. The data available at the outputs of the sensors are coupled to a central computer 60 where the data is collected and fused. Sensor fusion in this manner provides redundancy and improved reliability. "Sensor fusion," in the context of this embodiment, means receiving and assimilating position data from two or more sources. That is, multiple sources are used to generate and calculate the same piece of position datum.

Computer 60 receives surveillance data from each of the plurality of sensors. The data is used to calculate a position for each of the target vehicles being tracked. Each of the sensors, either continuously or periodically, senses the position of each of the target vehicles. Thus, time dependent data is generated regarding the position of the target vehicles. Computer 60 uses the time dependent data to calculate a historical track for each target vehicle. Additionally, based on this time dependent data, computer 60 calculates a projected track for each target vehicle. Each sensor detecting traffic information and sending data to computer 60 may provide a slightly different position report for each target. This difference in position reports is a result of the performance and error associated with each sensor in addition to environmental or other effects on each sensor type. Additionally, none of the sensors is absolutely accurate; that is, some error is associated with each sensor measurement. For example, some error is present in both the range and azimuth detected for a particular target because of scanning, reflections from other objects in the vicinity, inherent inaccuracies in the equipment, environmental conditions, and the like. Computer 60 calculates an estimated boundary of position certainty for each target vehicle based on the inherent inaccuracies in the data received from each of the sensors. The boundary can be established by numerous methods known in the art. For example, such boundaries could be established by error models (e.g., statistical or biasing data) corresponding to each sensor. Based on this information, position reports can be generated to achieve a composite or average position estimate (based on all available sensors reporting on a specific target). Thereafter, computer 60 can employ statistical variation analysis to generate an estimated boundary around the target. Computer 60 also calculates a boundary of track certainty for each calculated projected track. Again, the boundary of track certainty is based on known uncertainties in the sensor data and indicates the range of probable tracks that a target will exhibit at some time in the future.

In accordance with this embodiment of the invention, computer 60 calculates a position and projected track based on the input from each of the individual sensors. Computer 60 also fuses the data from each of the individual sensors and calculates a derived target position estimate based on the multiple sensor position reports by methods known in the art. A weighted position estimate and a weighted projection track is thus derived based on the fused data from the multiple sensor reports. In addition, a boundary of position certainty and a boundary of track certainty are calculated for the weighted target position estimate and projected track. The boundary position certainty and boundary of track certainty thus provide weighted certainties based on the input from each of the individual sensors. Any or all of the calculated positions, historical tracks, projected tracks, and boundaries of certainty can be displayed on a display screen 62 coupled to computer 60.

Figure 3:
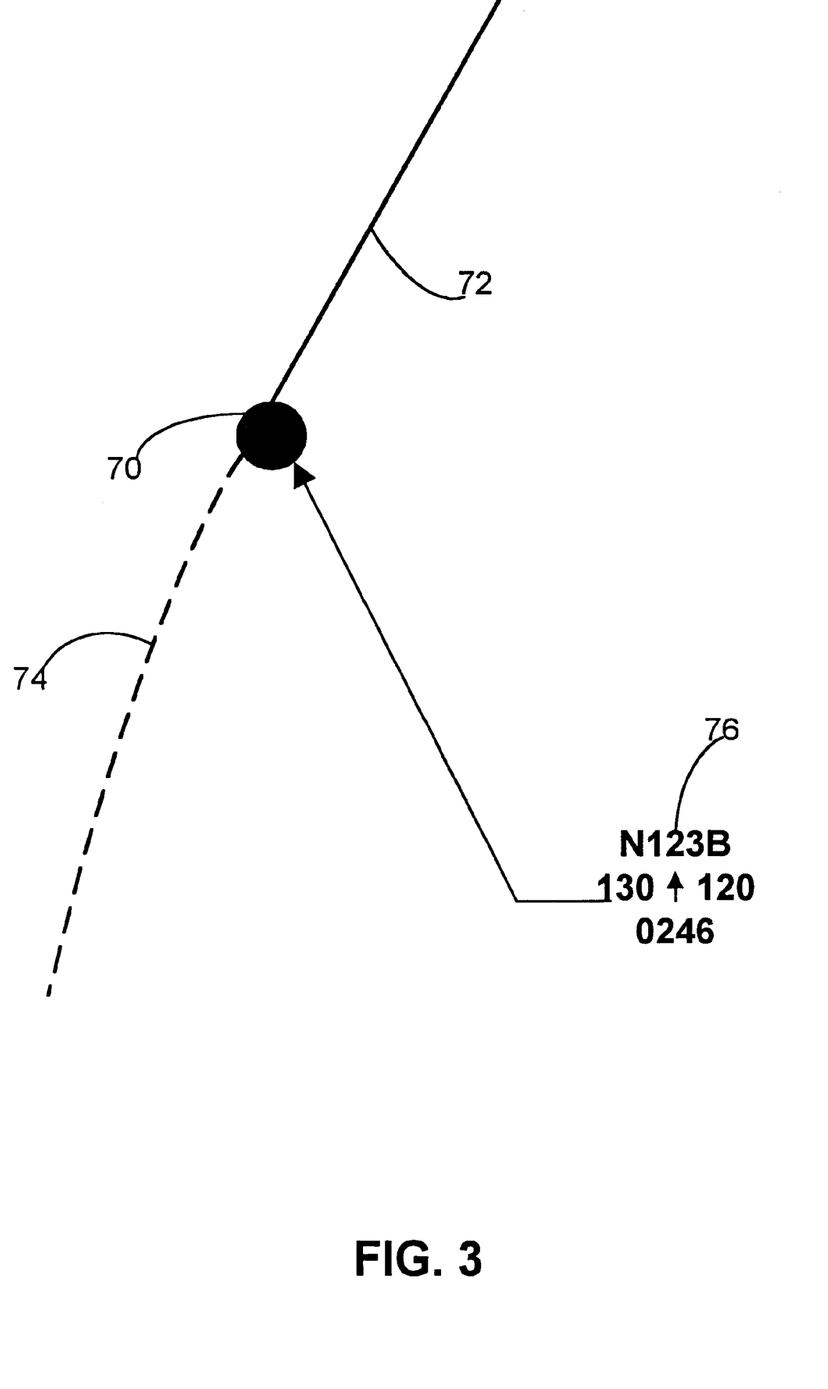
FIGS. 3–7 illustrate representative displays to be found on a display screen in accordance with various embodiments of the invention.

The position and track information calculated by computer 60 and displayed on display screen 62 can be displayed in a number of different ways in accordance with various embodiments of the invention as illustrated in FIGS. 3–7. In the fused data displays illustrated, each sensor provides a weighted contribution to the reported state vector of the target vehicles. The state vector includes the derived target position estimate and the projected target track. The simplest display of this target information is illustrated in FIG. 3 that depicts the information for a single target vehicle. FIG. 3 illustrates a derived target position estimate 70 and a projected target track 72. In addition, an historical target track 74 is also displayed. A tag 76 is also displayed for the target vehicle. In this example, tag 76 identifies the target aircraft as N123B. The tag also indicates that the last assigned altitude was 12,000 feet and that the aircraft is climbing to 13,000 feet. The transponder squawk is identified as 0246. The advantage of the display illustrated in FIG. 3 is the similarity to current presentations for singular sensors used in current air traffic display systems. An additional advantage is the minimized clutter on the display screen. Like the current air traffic display systems, however, there is no indication of the uncertainty in the target vehicle's actual position as opposed to the mathematically calculated position based on the combination of the multiple sensor inputs. Based on the information illustrated in FIG. 3, it may be difficult to determine whether adequate separation is being provided between the target aircraft and other traffic in the area.

Figure 4:
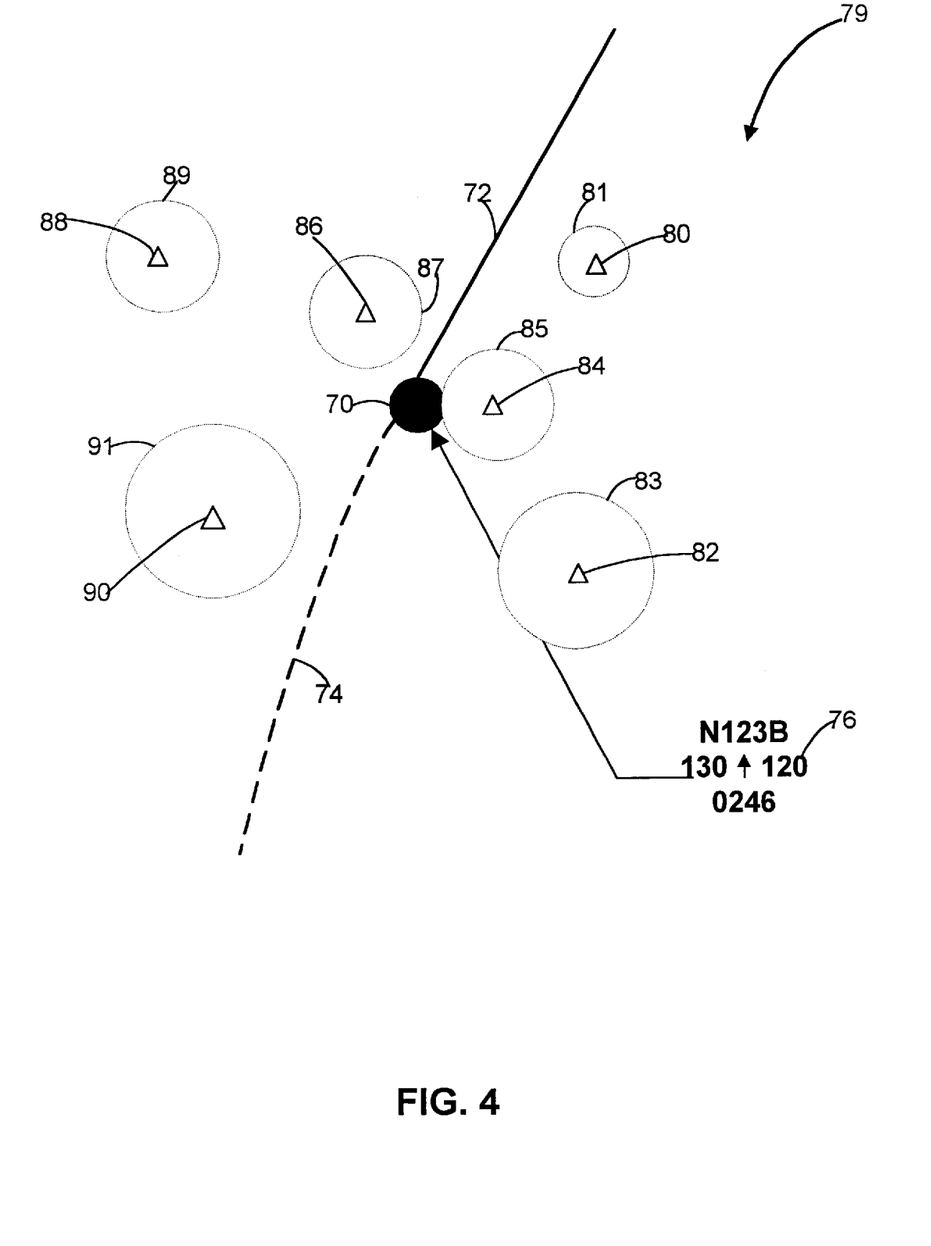

FIG. 4 illustrates a display screen pattern 79 in accordance with a further embodiment of the invention. In addition to the information displayed in FIG. 3, Display 79 also displays a position report 80, 82, 84, 86, 88, and 90 from each of the individual surveillance sensors that provided position data used to calculate the weighted estimate of target position 70. Associated with each of the individual target positions is a maximum error bound 81, 83, 85, 87, 89, and 91, respectively, for each target report, displaying a certainty level of each of the position reports. Display 79 thus provides a mosaic display of the position report from each sensor element used for surveillance combined with the weighted estimate of position based on the fused data.

Figure 5:
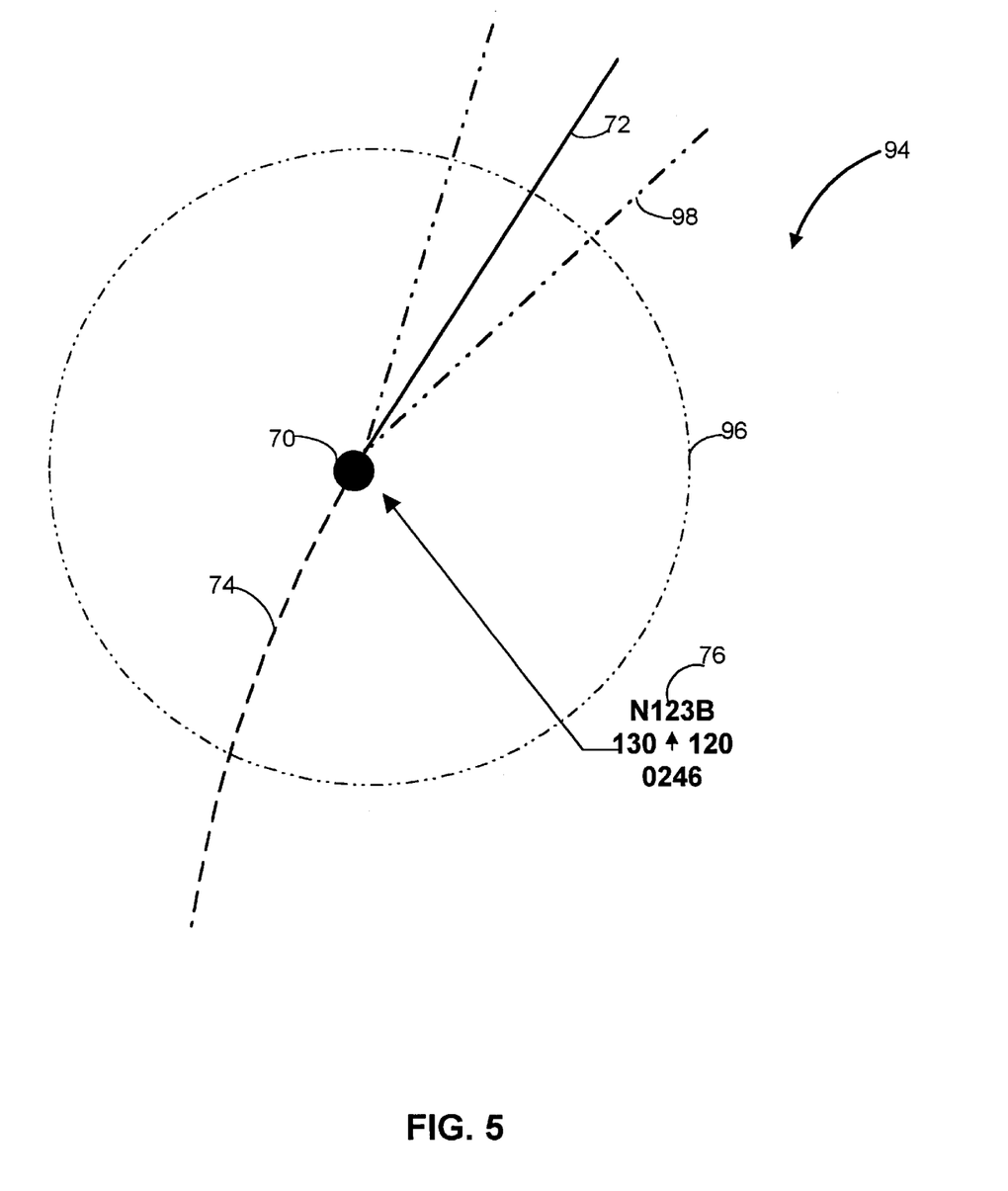
Figure 6:
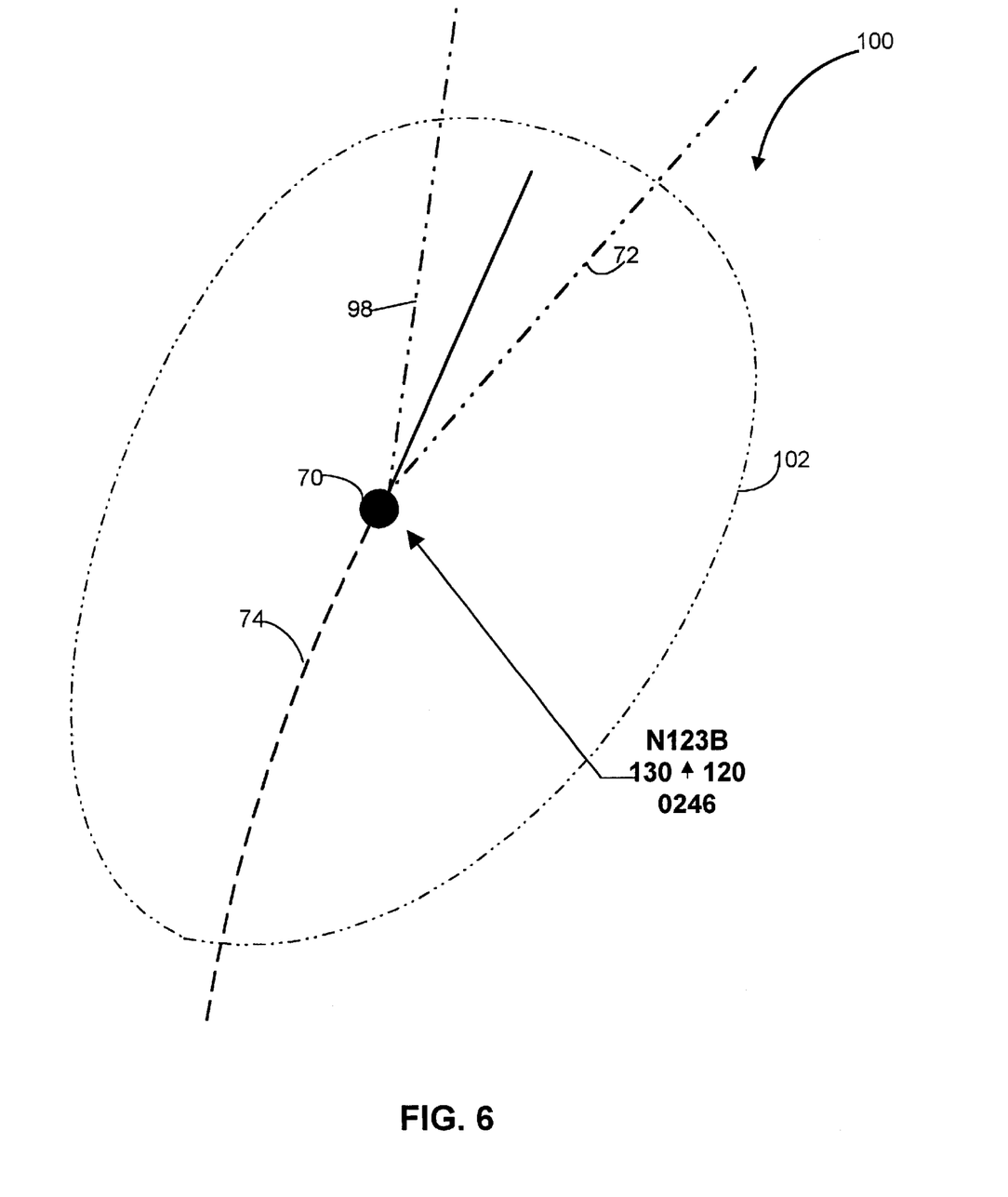

FIG. 5 illustrates, in accordance with a further embodiment of the invention, a display 94 that provides an indication both of position and projected track as well as a boundary of certainty for both the position and the projected track without the clutter that is associated with FIG. 4. Display 94 includes a target position estimate 70, a projected track 72 for the target, and an historical track for the target, all based on the fused data from a plurality of surveillance sensors. Display 94 also includes a boundary of position certainty 96 that is calculated based on the position data given by each of the surveillance sensors. This boundary indicates the limit of the probable area in which the target vehicle will currently be located. Display 94 also includes a boundary of track certainty 98 that is based on the information from each of the surveillance sensors and on the projected track calculated from that information. Boundary of track certainty 98 indicates the range of probable tracks that the target will exhibit at some time in the future. The certainty boundaries are mathematically defined by position and track error budgets, target vehicle geometry, and air traffic control separation standards.

Certainty boundaries might also be modified in accordance with one embodiment of the invention by the influence of, for example, current weather conditions and/or operating levels. Such modifications might result in a certainty boundary that is not necessarily circular nor symmetrical, as indicated by Display 100 illustrated in FIG. 6. As illustrated, the boundary of position certainty 102 is non-circular, as modified by weather conditions and/or other instantaneous influences. In each of the embodiments illustrated, the position, the projected track, the boundary of position certainty and the boundary of track certainty will change in real time, based on continuous calculations of the certainty equation for each target vehicle. This gives the air traffic management specialist a continuously upgraded separation assurance decision aide.

Figure 7:
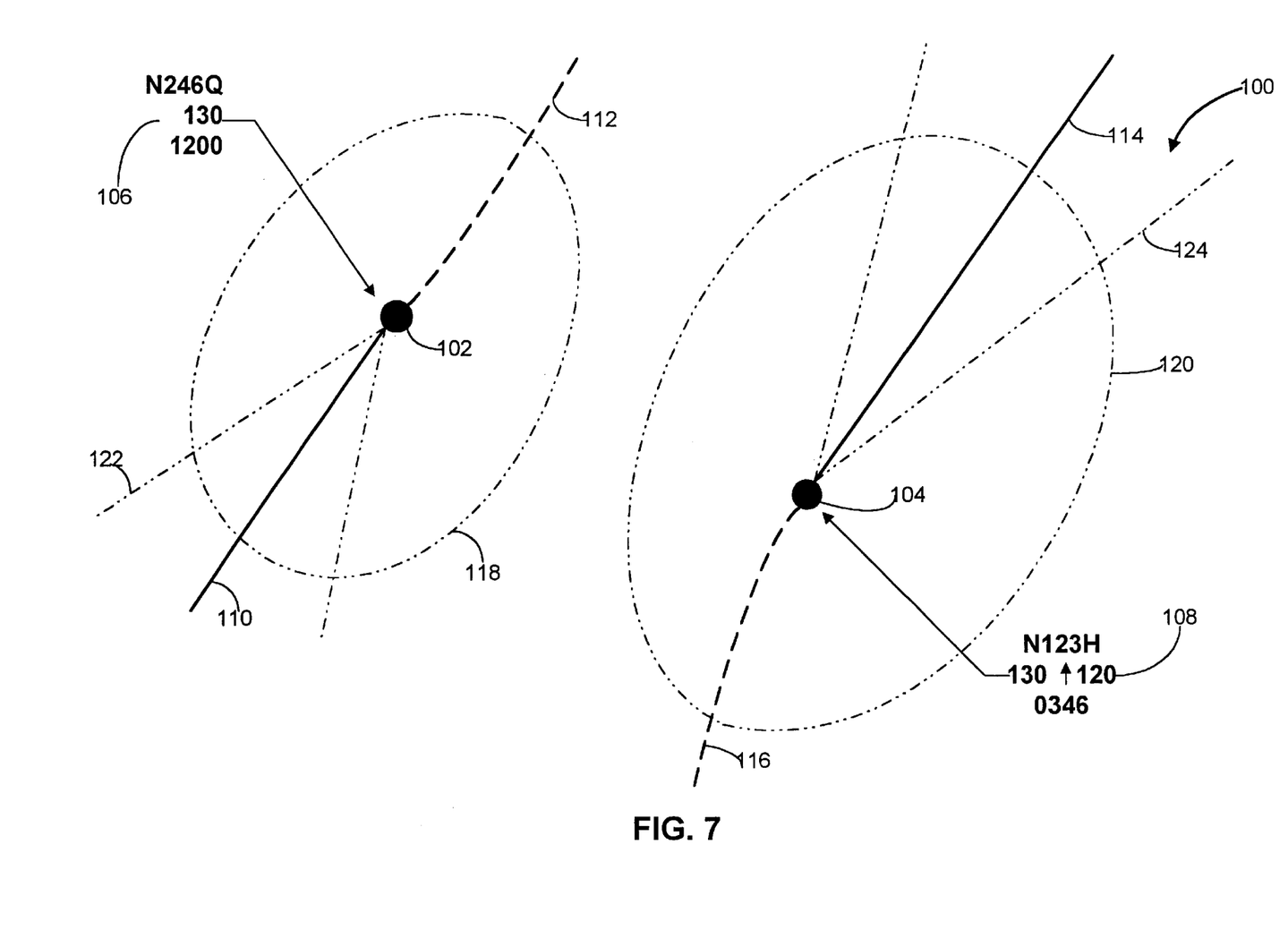

FIG. 7 illustrates how a display screen 100, in accordance with an embodiment of the invention, might appear to an air traffic control manager when two aircraft are in the area. Display screen 100 includes a target position estimate 102 for a first aircraft and a target position estimate 104 for a second aircraft. Target position estimate 102 is tagged with tag data 106 identifying the first aircraft as N246Q and target position estimate 104 is tagged with tag data 108 identifying the second aircraft as N123H. Display screen 100 also includes a projected track 110 and an historical track 112 for the first aircraft and a projected track 114 and an historical track 116 for the second aircraft. The display screen also illustrates a boundary of position certainty 118 and 120, respectively, and a boundary of track certainty 122 and 124, respectively, for the first and second aircraft. All of the data displayed on display screen 100, except for the tag data, in accordance with this embodiment of the invention, results from the fusion of data from a plurality of surveillance sensors. As illustrated, the air traffic control manager can be assured that separation between the two aircraft can be safely maintained; there is no overlap between the boundary of certainty for either the position or the track of the two aircraft.

Figure 8:
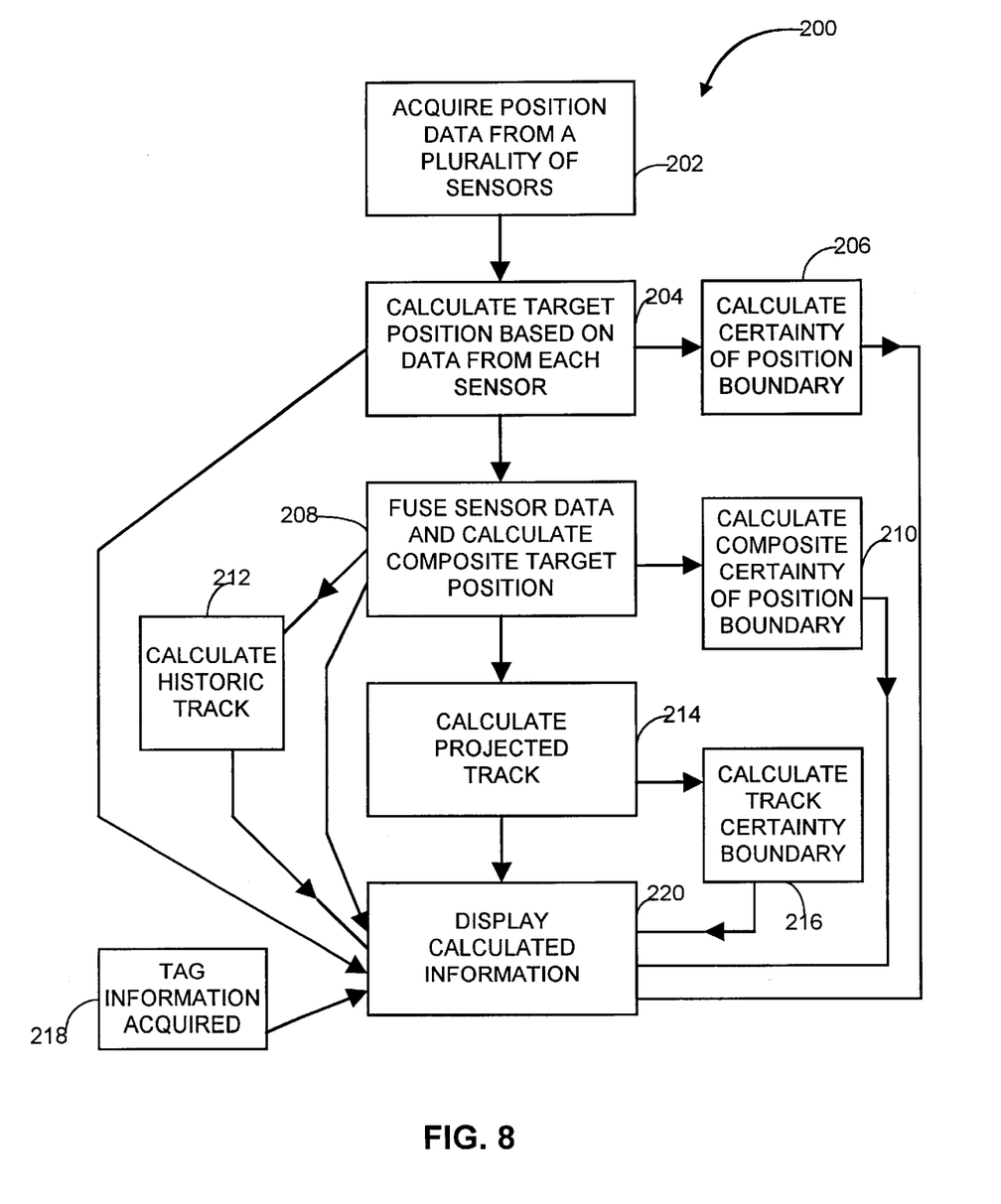
FIG. 8 illustrates, in flow chart form, methods for displaying target vehicle position information in accordance with various embodiments of the invention.

FIG. 8 illustrates, in a flow chart, a summary of a process 200 for displaying target vehicle information in accordance with various embodiments of the invention. The process starts with the acquisition in step 202 of position information from a plurality of surveillance sensors. Based on the data from each of the surveillance sensors, a target position for each target is calculated in step 204. A separate target position is thus calculated in response to the data received from each of the sensors. In addition, for each target position calculated in step 204, a boundary of position certainty is calculated in step 206. The process continues in step 208 by fusing the data from all of the surveillance to calculate a composite, fused sensor target position. The fused sensor data used to calculate a composite target position in step 208 is also used in step 210 to calculate a certainty of position boundary for the target position.

The acquisition of data and the calculation of target position is an ongoing and continuous process. Based on the calculation of target position in such a continuous manner, an historic track for the target aircraft is calculated in step 212 as is a projected target track in step 214. A certainty boundary for the projected track calculated in step 214 is calculated in step 216. Tag information such as aircraft identification is also acquired in step 218. The tag information can be acquired, for example, from an information source on the target aircraft itself.

The acquired and calculated information is then displayed in step 220. The displayed information can include any or all of the calculated and acquired information. For example, in a preferred embodiment, the composite target position, projected track, and boundary of certainty for both the position and projected track are displayed.

Thus it is apparent that there has been provided, a system and a method for displaying vehicle position information that fully meets the needs set forth above. Although the invention has been described and illustrated with reference to certain illustrative examples, it is not intended that the invention be limited to these illustrative embodiments. Those of skill in the art will recognized that various modifications and alternatives are possible without departing from the spirit of the invention. For example, although reference has been made throughout to "aircraft," it is intended that the invention also be applicable to vehicles that are on the ground. Accordingly, it is intended that the invention include all such modifications and alternatives as fall within the scope of the appended claims.

What is claimed is:

1. A method for displaying target vehicle position information comprising the steps of:

providing a plurality of sensors, each contributing traffic information data for each of a plurality of target vehicles;

fusing the traffic information data from each of the plurality of sensors to calculate a derived target position for each of the plurality of target vehicles;

displaying the calculated derived target position of each of the plurality of target vehicles as a singular target on a display screen; and displaying a position report of a target vehicle from each of the plurality of sensors with a maximum error bound for each position report.

2. The method of claim 1 wherein the step of displaying further comprises displaying an historical track of a target vehicle and a projected track of that target vehicle.

3. The method of claim 1 wherein the step of displaying further comprises displaying textual information including target vehicle identification for each target vehicle.

4. A method for displaying target vehicle position information comprising the steps of:

providing a plurality of sensors, each contributing traffic information data for each of a plurality of target vehicles;

fusing the traffic information data from each of the plurality of sensors to calculate a derived target position for each of the plurality of target vehicles;

displaying the calculated derived target position for each of the plurality of target vehicles as a singular target on a display screen; and displaying a fused estimate of the derived target vehicle with a boundary of position certainty for the derived target position.

5. A method for displaying vehicle position information comprising the steps of:

providing a plurality of sensors, each supplying traffic information data on each of a plurality of target vehicles;

periodically calculating a target position and a boundary of position certainty for each target vehicle based on traffic information from each of the plurality of sensors individually;

periodically calculating a fused target position and a boundary of position certainty for each target vehicle based on traffic information supplied by all of the sensors collectively;

calculating a projected track and a boundary of track certainty for each target vehicle based on the periodically calculated fused target positions; and displaying on a display screen the fused target position and boundary of position certainty and the projected track and boundary of track certainty for each target vehicle.

6. The method of claim 5 further comprising the step of displaying on the display screen the periodically calculated target position and boundary of position certainty for each target vehicle based on information from each of the plurality of sensors.

7. The method of claim 5 further comprising the step of modifying the calculation of boundary of position certainty and boundary of track certainty in response to weather conditions and operating conditions.

8. An air traffic display system comprising:

a plurality of sensors, each sensor providing traffic information on aircraft within its range;

a computer coupled to and receiving inputs on traffic information from each of the plurality of sensors, the computer configured to periodically calculate aircraft position and projected track for each aircraft based on a fusion of all traffic information received; and a display screen coupled to the computer and configured to display the periodically calculated aircraft position and projected track.

9. The air traffic display system of claim 8 wherein the computer is further configured to calculate aircraft position and projected track for each aircraft based on traffic information from each sensor individually.

10. The air traffic display system of claim 9 wherein the display screen is further configured to display aircraft position and projected track calculated based on traffic information from each sensor individually.

11. The air traffic display system of claim 10 wherein the computer is configured to calculate and the display screen is configured to display a boundary of position for each aircraft position and a boundary of track certainty for each projected track.

12. The air traffic display system of claim 9 wherein the computer is configured to calculate and the display screen is configured to display a boundary of position certainty for each aircraft position and a boundary of track certainty for each projected track.

13. The air traffic display system of claim 12 wherein the computor is configured to calculate boundary of position certainty and the boundary of track certainty based on factors selected from a list comprising sensor error budgets, aircraft geometry, and air traffic control separation standards.

14. The air traffic display system of claim 13 wherein the computer is configured to calculate boundary of position certainty and the boundary of track certainty based on factors further comprising weather conditions and operating conditions.

15. The air traffic display system of claim 8 wherein the computer is configured to periodically calculate aircraft position and projected track based on a weighted contribution of traffic information from each of the plurality of sensors.

* * * * *